Patented June 27, 1950

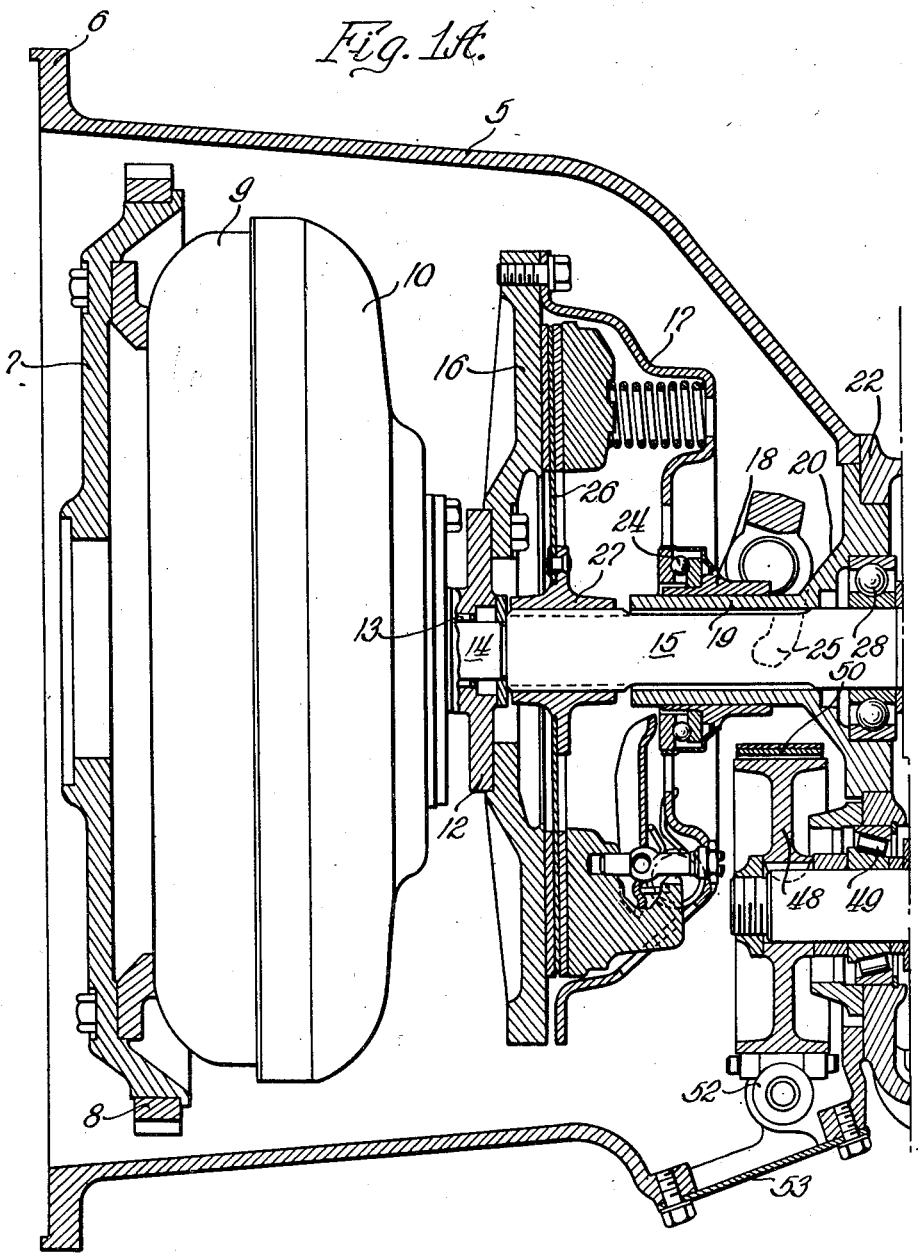

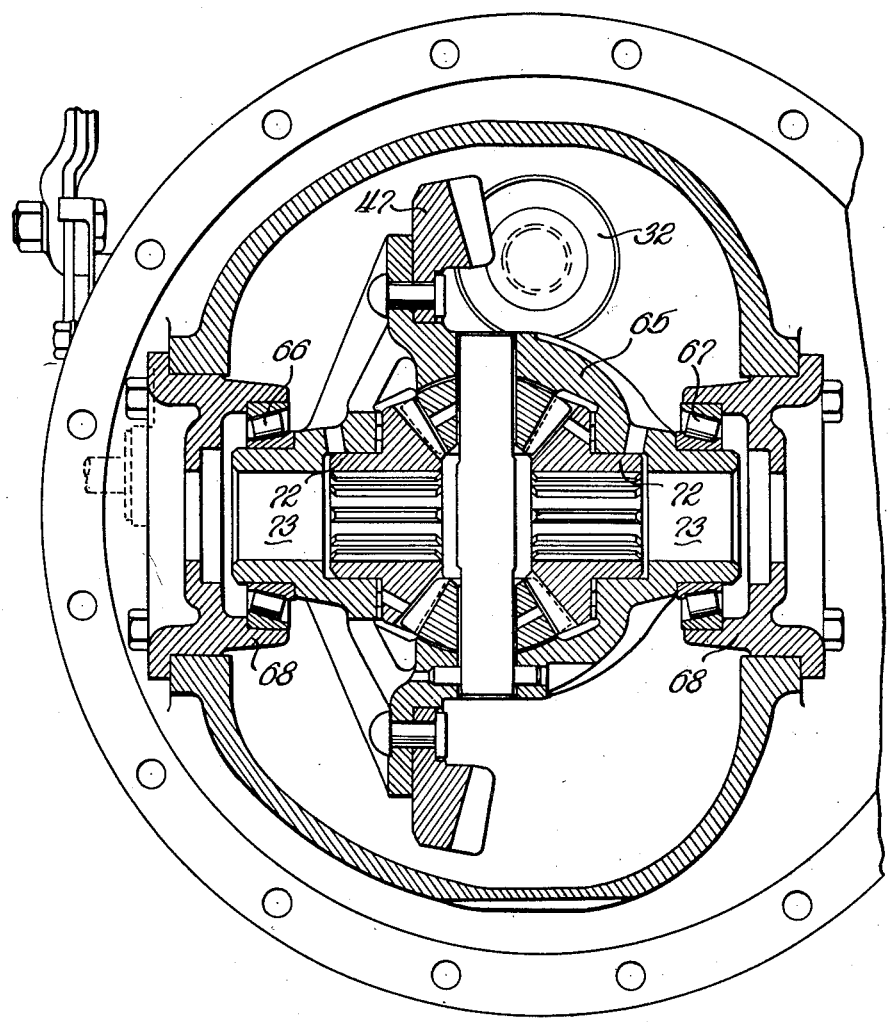

2,512,856

UNITED STATES PATENT OFFICE 2,512,856

TRANSMISSION

Phillip Fisk, Berrien Springs, Mich., assignor to Clark Equipment Company, Buchanan, Mich., a corporation of Michigan Application March 6, 1946, Serial No. 652,395

5 Claims. (Cl. 74—359)

This invention relates to transmissions, and more particularly is directed to a transmission of the type used in industrial and agricultural tractors and trucks where it is necessary to provide numerous forward and reverse speed changes but it is desired to provide a relatively compact and simplified transmission having the desired number of speed ratios and driven preferably from a fluid torque convertor or similar fluid turbo unit.

One of the disadvantages in transmissions of this type in which a fluid turbo unit is interposed between the transmission and the power source, has been the difficulty of selectively clutching the various speed trains in the gear box due to the idling torque imposed by the turbo unit which tends to cause the drive shaft of the transmission to rotate and, consequently, causes clashing of gears. In the present invention this is overcome by the provision of a simple friction clutch interposed between the driven element of the fluid turbo unit and the drive shaft extending into the transmission.

The present invention has as one of its primary objects to provide a transmission of the simplified design which will provide for two forward and two reverse speeds, certain of the gear trains themselves being in constant mesh and having sliding clutch elements for selectively connecting such gear trains to their respective shafts. In conjunction with this feature, there is also provided a brake mechanism for the output shaft of the transmission, which brake is mounted within the bell housing of the transmission immediately adjacent the clutch.

The present transmission also contemplates a construction of the rigid type in which the forward end of the transmission assembly is bolted to the power unit and the rear end thereof constitutes the differential housing for the driving axle.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1A is a sectional view through the fluid turbo unit and clutch of the present transmission;

Figure 2 is a view, partly in section, of the differential mechanism driven from the transmission.

Figure 1B:
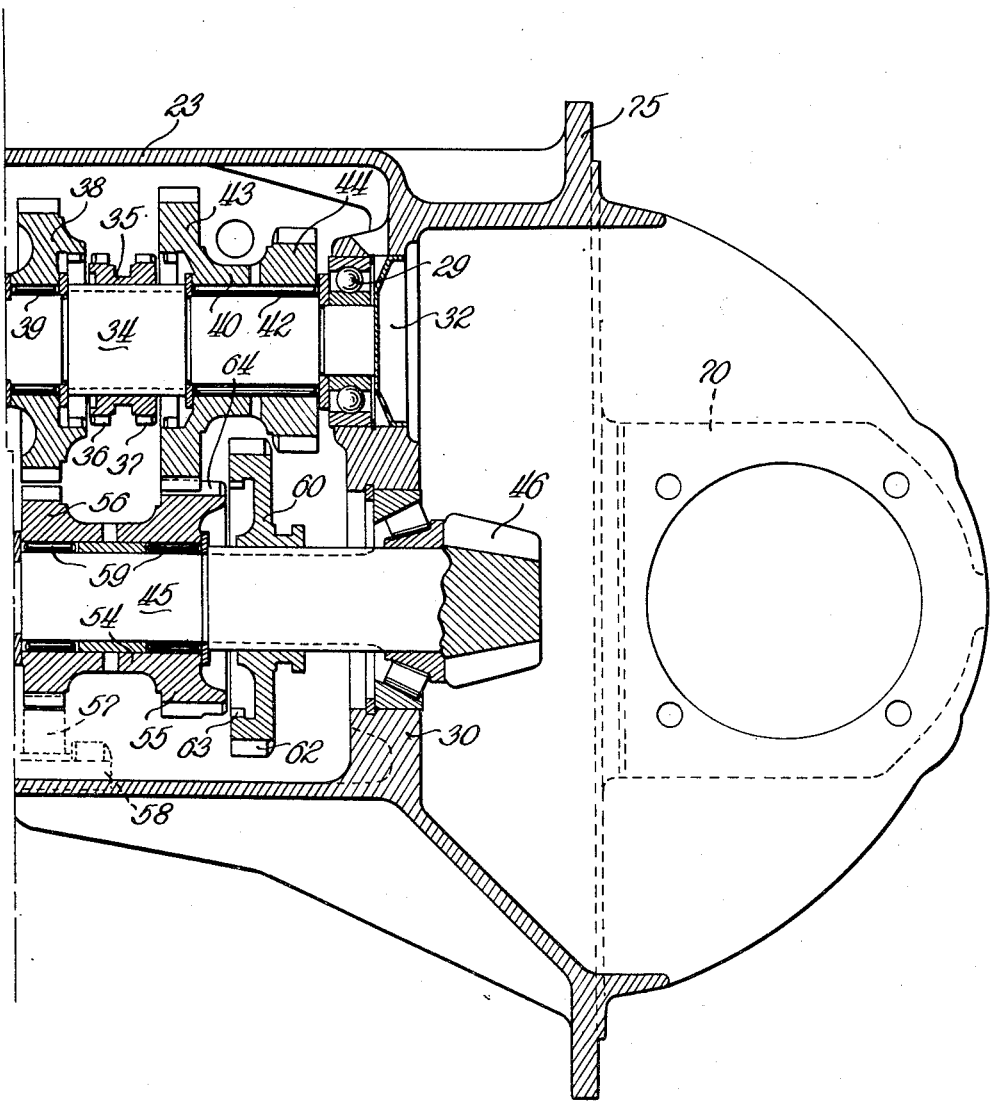
Figure 1B is a continuing sectional view of the gear box and drive pinion portion of the transmission.

Referring now in detail to the drawings, there is provided a bell housing 5 which has a flanged portion 6 adapted to be bolted about the flywheel housing of the engine or other power source. A radial disc member 7 is adapted to be bolted to the crank shaft of the engine and carries around its periphery the starter gear 8. Also secured in any suitable manner to the flywheel 7 is the driving element 9 of a fluid turbo unit which constitutes the impeller of such unit.

The driven member of such unit, which may be called the rotor, is disposed within the housing 9, 10 and is adapted to have a flanged hub portion 12 extending rearwardly therefrom and recessed to receive bearings 13 which journal the reduced end 14 of the transmission main or driving shaft 15 therein. The flanged member 12 is bolted to the rotatable clutch plate 16 to which is secured the clutch housing member 17 mounted in any suitable manner as by means of the sleeve 18 upon the cylindrical extension 19 of the flanged member 20 which is bolted or otherwise suitably secured to the forward end portion 22 of the transmission housing 23. The sleeve member 18 is adapted to carry the clutch thrust bearing 24 operated by the rocker arm 25 for actuating the friction clutch disc 26, whereby the rotor 10 may be clutched or unclutched from the shaft 15 through the splined hub 27 carried upon the splined portion of the shaft 15. Consequently, the shaft 15 may be mechanically uncoupled from the turbo unit 9, 10 or may be clutched thereto through the action of the friction clutch.

The shaft 15 is adapted to be journalled in a suitable bearing assembly 28 carried within the member 20 and then extends into the transmission housing 23, being rotatably journalled at its opposite end by the ball bearing assembly 29 in the end wall 30 of the transmission housing. The end of the shaft is suitably closed from the differential housing by means of the plug element 32.

Within the transmission housing 23 the shaft 15 is provided with an intermediate splined portion 34 upon which is mounted the sliding clutch member 35 having axially spaced sets of clutch teeth 36 and 37. Rotatably mounted on the shaft 15 on opposite sides of the splined portion 34 thereof is the rotatable gear member 38 which is journalled on the shaft by means of roller bearings 39 and the compound gear member 40 also rotatably journalled upon the shaft 15 as by means of bearings 42. The compound gear member 40 has a first gear portion 43 and a spaced gear portion 44.

Extending parallel to the shaft 15 within the transmission housing is the driven or output shaft 45, which shaft at one end is provided with the pinion portion 46 adapted to have driving engagement with a ring gear 47 shown in Figure 2, and at its opposite end is provided with the brake drum 48 disposed within the bell housing 5 on the free end of the shaft 45 beyond the tapered bearing 49.

The brake drum 48 is encircled by a brake band 50 and is provided with suitable mechanism indicated generally at 52 for contracting the band about the surface of the drum when it is desired to effect braking of the transmission. A suitable inspection opening is provided in the lower end of the bell housing and is covered by the plate 53 which allows for inspection and adjustment of the brake mechanism when desired.

Mounted on the shaft 45 immediately adjacent the forward end wall of the transmission housing 23 is a compound gear member 54 having the gear portion 55 in constant meshing engagement with the gear portion 43 of gear 40. The opposite end of the gear member 54 is provided with a gear portion 56 having constant meshing engagement with idler gear 57, shown diagrammatically out of position for the sake of clarity, which idler gear member 57 is mounted upon the idler shaft 58 and is disposed in a laterally offset position intermediate shafts 15 and 45. The idler gear 57 also is in constant meshing engagement with the gear 38, whereby the gears 38 and 56 are in constant driving relationship.

The shaft 45 is splined intermediate the pinion portion 46 and the bearings 59 upon which the gear member 54 is mounted, and a sliding gear member 60 is mounted on the splined portion of the shaft and has external gear teeth 62 adapted to mesh with the teeth of the gear member 44 mounted on shaft 15. The gear member 60 is also provided with internal clutch teeth 63 adapted to mesh with clutch tooth portions 64 on the gear member 55, whereby the compound gear 54 may be clutched to the shaft 45 when the gear 60 is shifted to the left from the neutral position shown in Figure 1B.

In the operation of the transmission as thus far described, it will be apparent that a first forward driving speed can be effected through the transmission by shifting the gear member 60 to the right from the neutral position shown in Figure 1B into meshing engagement with the gear 44, and at the same time shifting the clutching member 35 to the right to clutch the compound gear member 40 to the splined portion 34 of the shaft 15. Thus, the shaft 15 drives the compound gear 40 and through the gear portion 40 drives the gear 60 splined on the shaft 45. This provides low speed driving connection from the fluid turbo unit to the pinion 46.

With the clutch member 35 remaining in its shifted position, clutching gear 40 to shaft 15, the gear 60 can be shifted to the left to clutch compound gear 54 to shaft 45, thereby providing a driving connection from shaft 15 through gear portion 43 to gear 55 and thence through the clutch teeth 64 and 63 into gear 60 and, consequently, to shaft 45 to drive the pinion 46 in a second forward speed ratio.

When it is desired to provide for reverse drive of the pinion 46 the coupling member 35 is shifted to the left to clutch gear 38 to shaft 15. Gear 56 then drives gear 46 of compound gear 54 through the idler gear 57 and with gear 60 clutched to the gear 55, will drive the shaft 45 and consequently the pinion 46 in a reverse direction of rotation. In addition, a low speed reverse drive can be effected by shifting gear 60 to the right into mesh with gear portion 44 of gear 40, which in turn is driven from gear 55 in turn driven by idler gear 57 from gear 38.

In Figure 2 there is shown the differential mechanism which is driven from the pinion 46. This includes a ring gear 47 riveted or otherwise suitably secured to the differential case 65, which case is journalled at its opposite ends in bearings 66 and 67 carried by bearing sleeve 68 suitably mounted in the bearing gear portions 70 formed integral with the rear end of the differential portion of the transmission housing 23.

The differential mechanism is of more or less standard type, including the two side pinions 72 into which are extended axle shafts through the openings 73 of the differential case whereby oppositely extending axle shafts are thereby driven by rotation of the differential ring gear 47. The ring gear housing is adapted to be bolted to the flange 75 of the transmission housing to close the open end thereof, thereby providing for a rigid unitary construction of the transmission and differential mechanism.

It is believed apparent that any desired control system may be provided for effecting the shifts required in the clutch member 35, and the gear member 60 of the transmission. It will be apparent that with the clutch member 35 shifted to the right the transmission is conditioned for forward drive, and it is merely necessary to shift the gear member 60 in opposite directions from the neutral position shown in Figure 1B to effect either low speed or high speed drive to the drive shaft 45. Similarly, when the clutch member 35 is shifted to the left, two reverse drives are effected by having the gear member 60 clutched to the gear member 55, or to gear portion 44. By the use of the transmission brake mounted on the end of the shaft 45 rotation of this shaft can be controlled to provide for selective shifting of gear 60 thereon without necessitating any synchronizing mechanism. Similarly, the provision of the friction member between the fluid turbo unit and the shaft 15 allows shifting of the clutch member 35 without requiring the use of a synchronizer or the like. This insures rapid shifting of the gear trains when desired and yet eliminates the necessity of providing elaborate space-consuming synchronizing mechanisms.

Thus, it will be seen that initial shifting of clutch member 35 will determine the direction of drive, and selective shifting of gear 60 will then determine either low or high speed ratio of drive in the selected direction.

I am aware that various changes may be made in certain details of the present construction and I, therefore, do not intend to be limited to the exact details of the construction herein disclosed and illustrated, but only insofar as defined by the scope and spirit of the appended claims.

I claim:

1. In a transmission having a driving shaft and an output shaft, a pair of axially spaced gears rotatably mounted on said driving shaft, one of said gears having axially spaced tooth portions, a compound gear rotatably mounted on said output shaft having one gear portion thereof in constant mesh with one tooth portion of said one gear on said driving shaft, a gear splined for sliding movement on said output shaft and engageable in one position with the other tooth portion of said one gear on said driving shaft, clutch teeth on said sliding gear adapted in another position thereof to engage said one gear portion for clutching said gear to said output shaft, a sliding clutch member on said driving shaft selectively operable to clutch either of said first-named axially spaced gears to said shaft, and idler gear means in constant meshing engagement between said other of said pair of gears and the other gear portion of said rotatable gear on said output shaft.

2. A transmission construction including an input shaft and a parallel output shaft, said input shaft having a pair of axially spaced gears rotatably mounted thereon and a sliding clutch therebetween for selectively coupling either of said gears to said shaft, one of said gears having axially spaced gear portions, a rotatably mounted compound gear on said output shaft having one gear portion in constant mesh with one gear portion of said one input shaft gear, idler gear means in constant meshing engagement between said other input shaft gear and said other gear portion of said output shaft gear, and a sliding gear splined on said output shaft and shiftable in one direction from a neutral position to clutch said rotatable gear to said output shaft and in the opposite direction into meshing engagement with the other gear portion of said one input shaft gear.

3. In combination, a transmission main shaft having a pair of axially spaced gears rotatable thereon, one of said gears being a compound gear, clutch means on said shaft for selectively clutching either of said gears thereto, an output shaft having a rotatable compound gear thereon fixed against axial movement, one portion of said compound gear being in direct mesh with one gear portion of said compound main shaft gear, and the other portion of said compound gear being in constant mesh with said other main shaft gear through idler gear means, and a sliding gear member splined on said output shaft and shiftable in one direction to clutch said compound gear to said output shaft and in the opposite direction into meshing engagement with the other gear portion of said compound main shaft gear.

4. In a transmission, a main shaft and an output shaft, a compound gear rotatable on said main shaft, a compound gear rotatable on said output shaft, one gear end of one compound gear being in mesh with one gear end of the other compound gear, a second gear rotatable on said mainshaft, idler means meshing between said second mainshaft gear and the free gear portion of said output shaft compound gear, clutch means between said mainshaft gears for selectively coupling them to said main shaft, and a sliding gear splined on said output shaft and including clutch means operable in one shifted position to clutch said output shaft compound gear to said output shaft, said sliding gear being shiftable into a second position into meshing engagement with the free portion of said main shaft compound gear.

5. In combination in a transmission having a main shaft and an output shaft, a pair of axially spaced rotatable gears on said main shaft, a compound gear rotatable on said output shaft, idler gear means meshing between one of said main shaft gears and one portion of said compound gear, the other of said main shaft gears meshing directly with the other portion of said compound gear, clutch means on said main shaft for selectively coupling either of said main shaft gears to said main shaft, clutch means on said output shaft for coupling said compound gear thereto, said other of said main shaft gears including a second gear portion, and gear means on said output shaft clutch means adapted to be shifted into meshing engagement with said gear portion.

PHILLIP FISK.

REFERENCES CITED

The following references are of record in the file of this patent:

UNITED STATES PATENTS

| Number | Name | Date |
|---|---|---|
| 1,613,190 | Packard | Jan. 4, 1927 |
| 1,654,069 | Caton | Dec. 27, 1927 |
| 1,678,029 | Wirrer | July 24, 1928 |
| 2,182,407 | Phelan et al. | Dec. 5, 1939 |
| 2,235,418 | Buchhart | Mar. 18, 1941 |
| 2,461,027 | Bodmer | Feb. 8, 1949 |